(12) United States Patent
Bowler

(10) Patent No.: US 11,453,090 B2
(45) Date of Patent: Sep. 27, 2022

(54) PISTON SEAL ASSEMBLY GUARDS AND INSERTS FOR SEAL GROOVE

(71) Applicant: RAYTHEON TECHNOLOGIES CORPORATION, Farmington, CT (US)

(72) Inventor: Patrick Bowler, Westfield, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/883,442

(22) Filed: May 26, 2020

(65) Prior Publication Data

US 2021/0370447 A1 Dec. 2, 2021

(51) Int. Cl.
*B23P 6/00* (2006.01)
*F01D 25/18* (2006.01)

(52) U.S. Cl.
CPC ............ *B23P 6/007* (2013.01); *F01D 25/183* (2013.01)

(58) Field of Classification Search
CPC ......... Y10T 29/49318; Y10T 29/49719; Y10T 29/49732; Y10T 29/49734; Y10T 29/49735; Y10T 29/49737
See application file for complete search history.

(56) References Cited

U.S. PATENT DOCUMENTS

| | | | |
|---|---|---|---|
| 3,701,536 A * | 10/1972 | Matthews | F16J 15/445 277/415 |
| 3,743,303 A * | 7/1973 | Pope | F01D 11/00 277/422 |
| 3,756,754 A | 9/1973 | Sakamaki | |
| 3,771,798 A * | 11/1973 | McDonald | F16J 15/4472 277/412 |
| 3,846,899 A * | 11/1974 | Gross | F01D 11/02 29/402.02 |
| 4,289,264 A * | 9/1981 | Rawlins | F16J 9/08 277/460 |
| 4,924,581 A * | 5/1990 | Jakobsen | B23P 6/005 29/402.02 |
| 5,026,075 A * | 6/1991 | Massarani | F01D 11/02 277/419 |
| 5,169,159 A * | 12/1992 | Pope | F16J 15/441 277/422 |
| 5,188,375 A * | 2/1993 | Pope | F16F 15/0237 277/630 |
| 5,314,304 A * | 5/1994 | Wiebe | F01D 11/122 277/414 |
| 6,200,689 B1 * | 3/2001 | Ferrigno | C21D 10/005 428/600 |

(Continued)

FOREIGN PATENT DOCUMENTS

GB 689129 3/1953

OTHER PUBLICATIONS

European Patent Office, European Office Action dated Oct. 21, 2021 in Application No. 21174202.8.

(Continued)

*Primary Examiner* — Jason L Vaughan
(74) *Attorney, Agent, or Firm* — Snell & Wilmer L.L.P.

(57) ABSTRACT

A method of repairing a piston seal assembly comprises removing worn material from a piston seal groove to generate a worked seal groove, applying a groove buildup member to the worked seal groove, and disposing a seal member proximate the groove buildup member.

3 Claims, 8 Drawing Sheets

(56) References Cited

U.S. PATENT DOCUMENTS

| | | | | |
|---|---|---|---|---|
| 6,350,102 B1* | 2/2002 | Bailey | ............ | F01D 5/20 |
| | | | | 415/173.5 |
| 6,626,350 B2* | 9/2003 | Meier | ............ | B23K 1/0018 |
| | | | | 228/119 |
| 7,966,707 B2* | 6/2011 | Szela | ............ | B23K 35/0244 |
| | | | | 29/402.11 |
| 8,330,071 B2* | 12/2012 | Shiino | ............ | F01D 11/08 |
| | | | | 219/121.64 |
| 9,186,757 B2* | 11/2015 | Munshi | ............ | F01D 11/14 |
| 9,796,055 B2 | 10/2017 | Anderson et al. | | |
| 10,215,098 B2 | 2/2019 | Cherolis et al. | | |
| 10,557,371 B2 | 2/2020 | Ruberte Sanchez | | |
| 2005/0132569 A1 | 6/2005 | Clark et al. | | |
| 2007/0044306 A1* | 3/2007 | Szela | ............ | B23K 9/04 |
| | | | | 29/889.1 |
| 2008/0166233 A1 | 7/2008 | Johnson et al. | | |
| 2010/0011774 A1 | 1/2010 | Johnson et al. | | |
| 2010/0021287 A1 | 1/2010 | Bouvier et al. | | |
| 2018/0080335 A1* | 3/2018 | Porter | ............ | F02C 3/04 |

OTHER PUBLICATIONS

European Patent Office; Extended European Search Report dated Feb. 21, 2022 in Application No. 21174202.8.

* cited by examiner

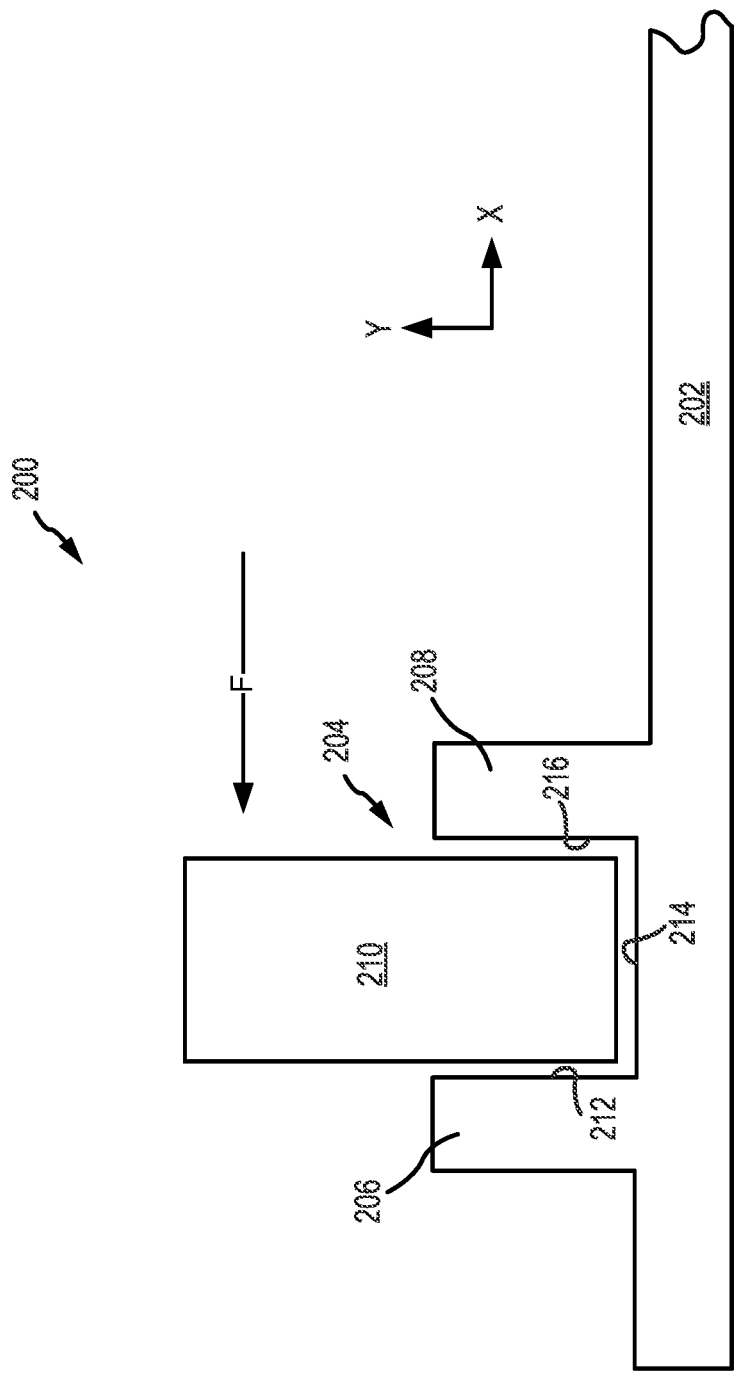

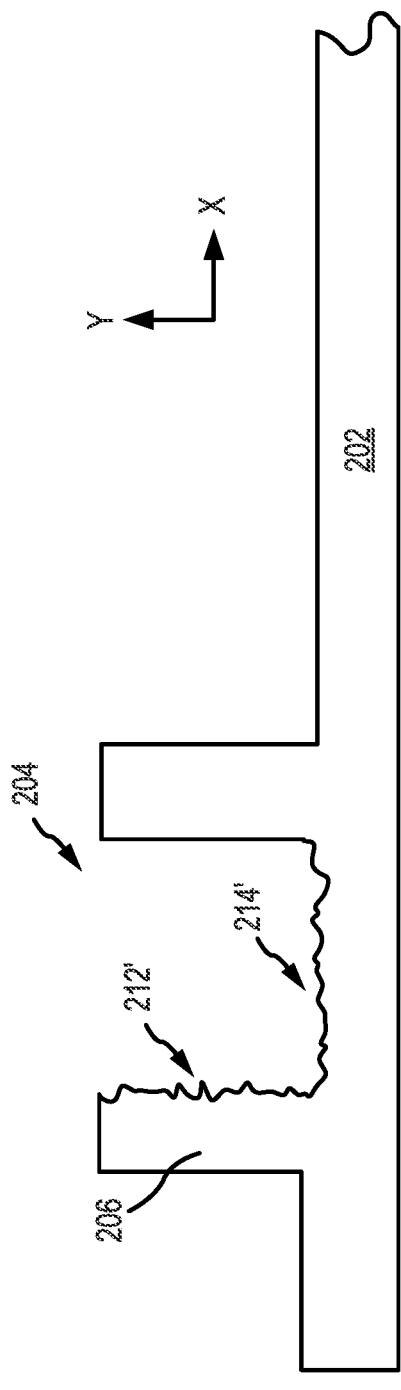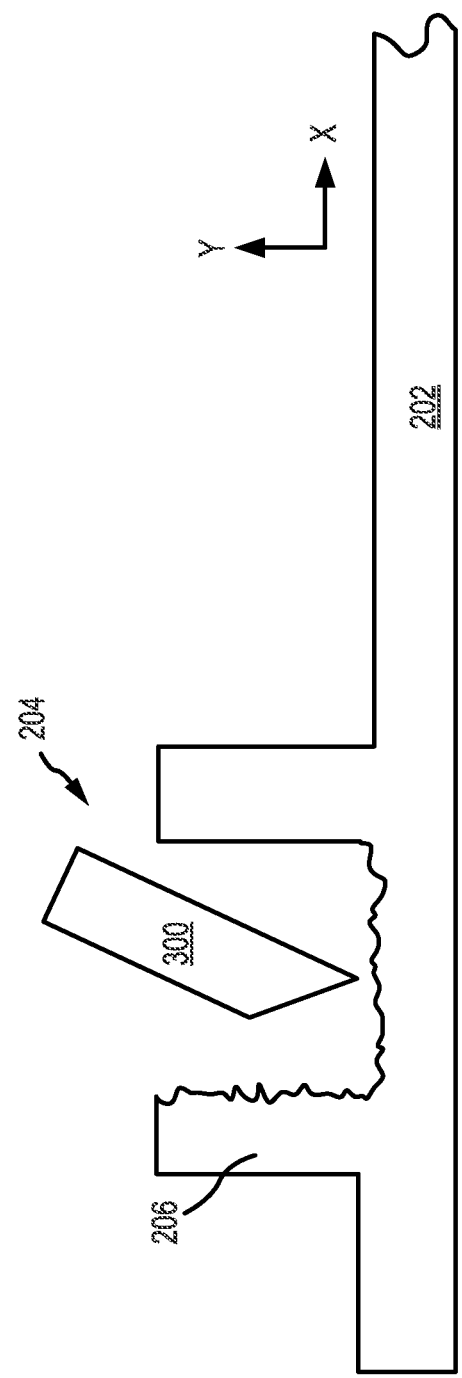

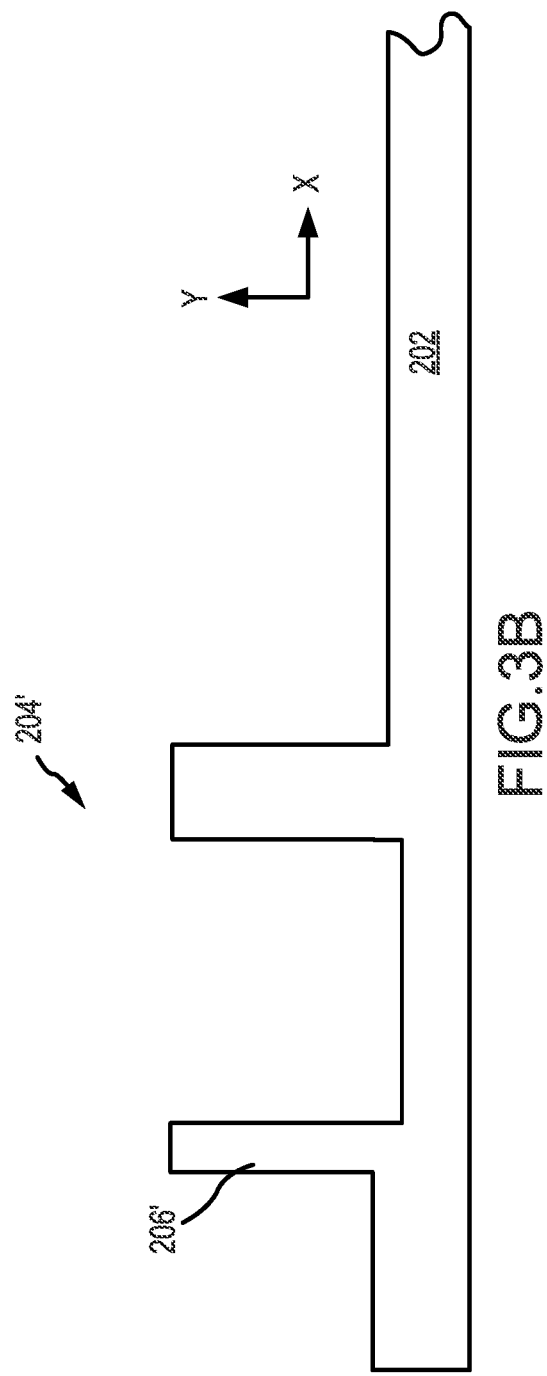

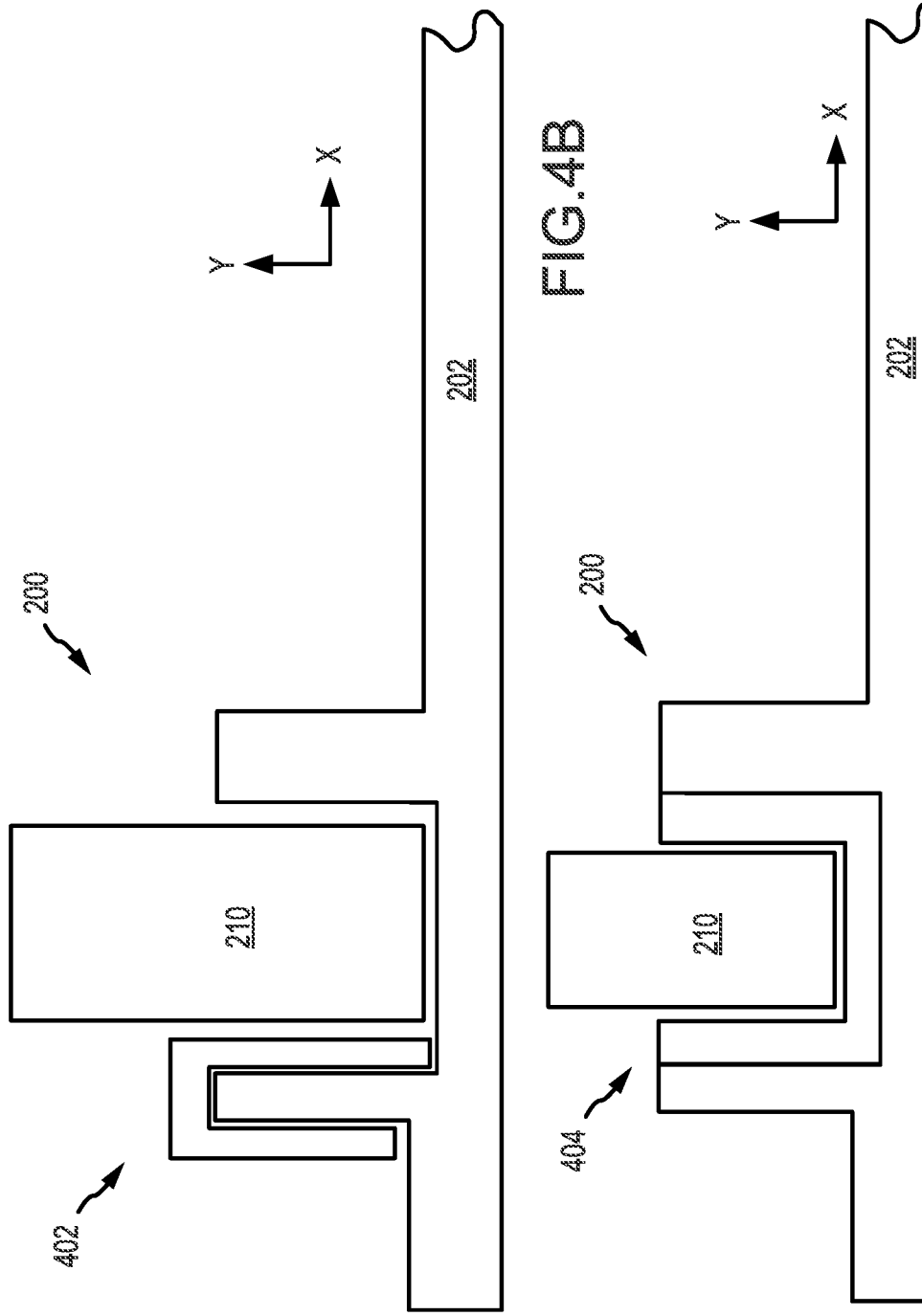

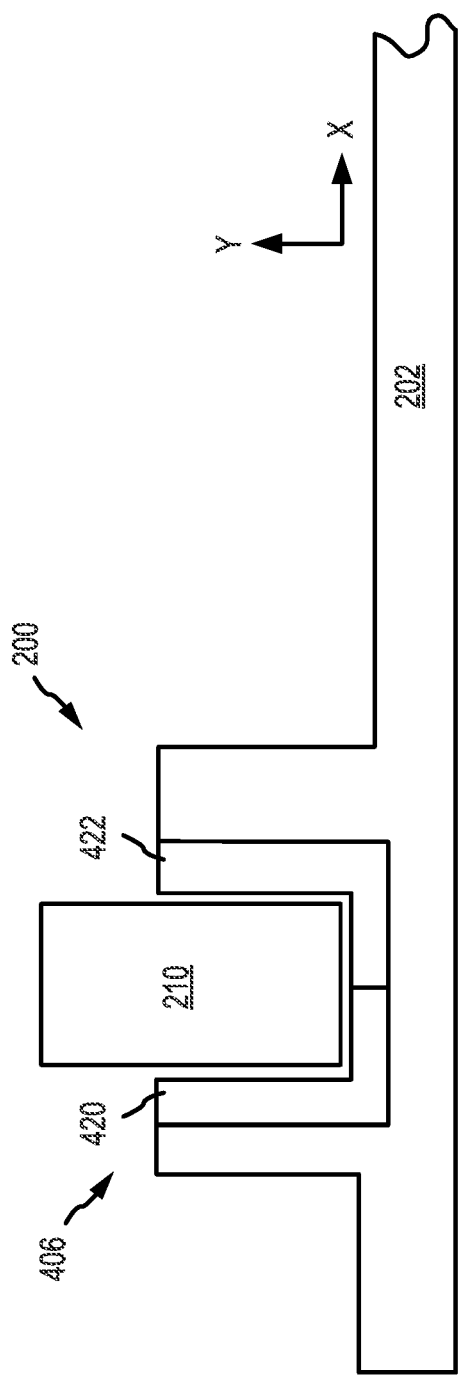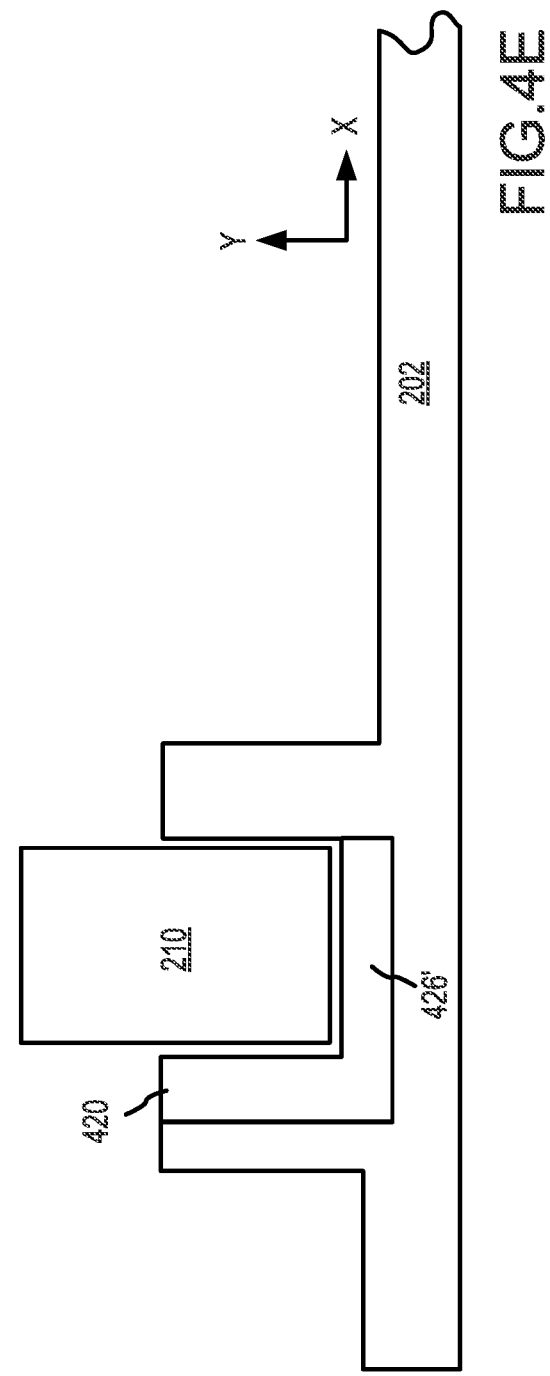

PISTON SEAL ASSEMBLY GUARDS AND INSERTS FOR SEAL GROOVE

FIELD

The disclosure relates generally to vehicles and machinery and, more specifically, to bearing carries and systems for turbine engines.

BACKGROUND

Gas turbine engines are known to include piston seal assemblies between various components, for example, to inhibit pressure loss between compartments or provide fluid sealing between compartments. In operation, piston seal assemblies may tend to degrade over time. For example, operational conditions of the gas turbine engine may tend to induce fretting at the loaded face of a seal groove. In this regard, piston seal assembly performance may tend to be reduced over time in response to fretting and/or other wear of the piston seal assembly features.

SUMMARY

In various embodiments, a method of repairing a piston seal assembly is disclosed comprising removing worn material from a piston seal groove to generate a worked seal groove, applying a groove buildup member to the worked seal groove, and disposing a seal member proximate the groove buildup member.

In various embodiments, the method includes securing the groove buildup member to the worked seal groove. In various embodiments, the method includes disposing the seal member within the groove buildup member. In various embodiments, the groove buildup member is a guard type member. In various embodiments, the groove buildup member is an insert type member. In various embodiments, the groove buildup member is a sectioned insert type member. In various embodiments, the groove buildup member comprises circumferentially segmented sections. In various embodiments, the groove buildup member is circumferentially continuous.

In various embodiments, a gas turbine engine is disclosed comprising a compressor section configured to compress a gas, a combustor section aft of the compressor section and configured to combust the gas, and a piston seal assembly comprising, a worked seal groove, a groove buildup member secured to the worked seal groove, and a seal member disposed proximate the groove buildup member.

In various embodiments, the seal member is disposed within the groove buildup member. In various embodiments, the groove buildup member is a guard type member. In various embodiments, the groove buildup member is an insert type member. In various embodiments, the groove buildup member is a sectioned insert type member. In various embodiments, the groove buildup member comprises circumferentially segmented sections. In various embodiments, the groove buildup member is circumferentially continuous.

In various embodiments, and article of manufacture is disclosed comprising a groove buildup member configured to be secured to a worked seal groove of a piston seal assembly, wherein the groove buildup member comprises one of a guard type member, an insert type member, or a sectioned insert type member each respectively configured to engage with a surface of the worked seal groove.

In various embodiments, the guard type member is further configured to interface with a reduced wall of the piston seal assembly and comprises an inner guard and an outer guard each joined at a distal end by an orthogonal web, wherein the inner guard is relatively longer than the outer guard. In various embodiments, the insert type member is configured to be disposed within the worked seal groove and comprises a forward wall, an aft wall, and a base web joining the forward wall and the aft wall and mutually orthogonal thereto. In various embodiments, the sectioned insert type member is relatively L-shaped and defined by a leg member and an orthogonal foot member extending at a distal end of the leg member. In various embodiments, the groove buildup member comprises circumferentially segmented sections.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 2A illustrates a piston seal assembly in a gas turbine engine, in accordance with various embodiments;

FIG. 2B illustrates a worn seal groove of a piston seal assembly, in accordance with various embodiments;

FIG. 3A illustrates a machining step of a repair method for a piston seal assembly, in accordance with various embodiments;

FIG. 3B illustrates the outcome of a machining step of a repair method for a piston seal assembly;

FIG. 4B illustrates a reworked piston seal assembly including a first groove buildup member, in accordance with various embodiments;

FIG. 4C illustrates a reworked piston seal assembly including a second groove buildup member, in accordance with various embodiments;

FIG. 4D illustrates a reworked piston seal assembly including a third groove buildup member, in accordance with various embodiments;

FIG. 4E illustrates a reworked piston seal assembly including a third groove buildup member, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
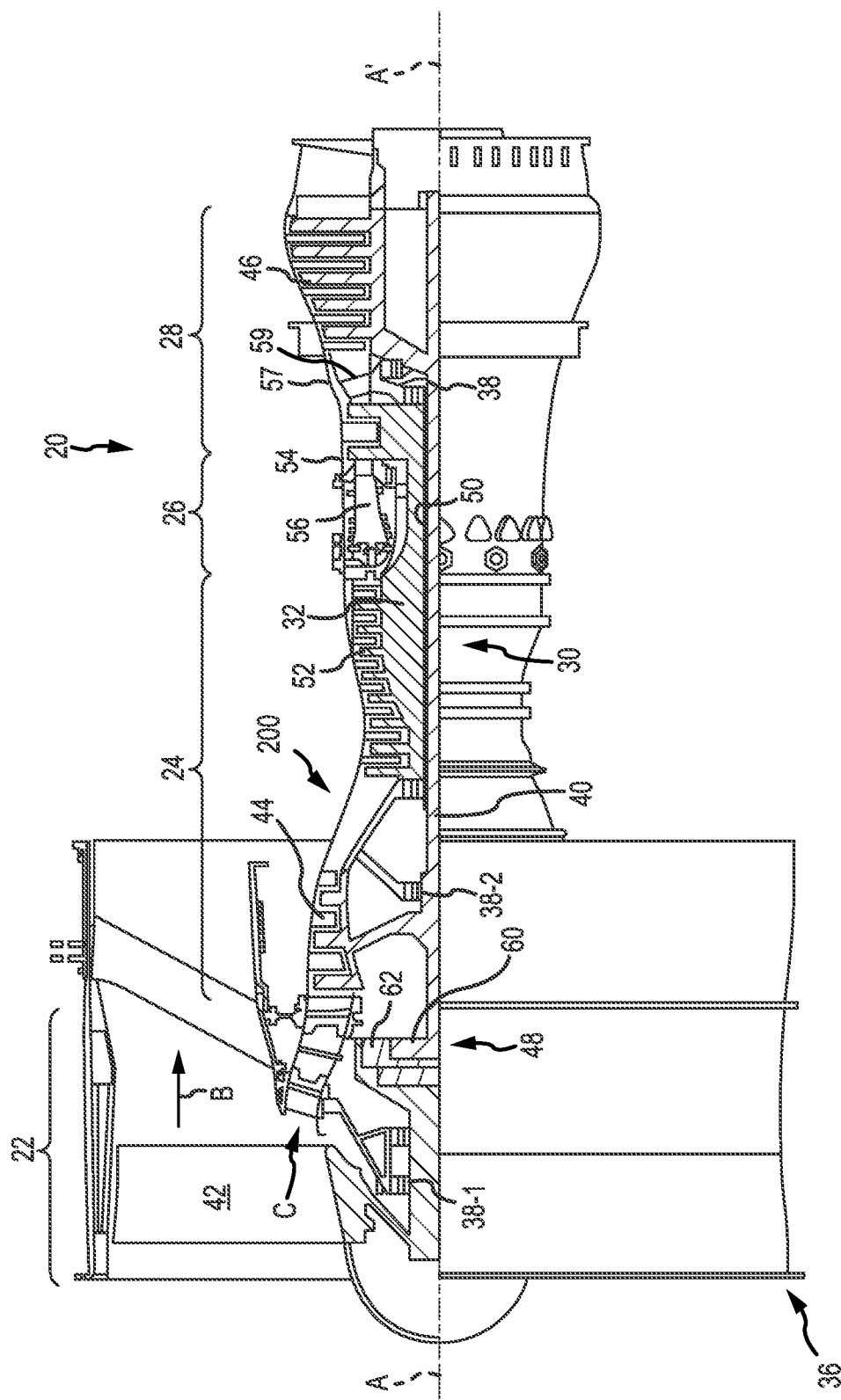
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high-speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

In various embodiments and with additional reference to FIGS. 2A and 2B, gas turbine engine 20 includes one or more piston seal assemblies 200. Piston seal assembly 200 is illustrated in cross section through the X-Y plane and may comprise a portion of a case 202 such as, for example, a high pressure compressor case, a combustor case, a mid turbine frame, and/or the like. The case 202 may extend axially along the engine 20 axis A-A'. The assembly 200 comprises a forward seal wall 206 and an aft seal wall 208. The seal walls 206 and 208 extend radially (along the Y-axis) from the case 202. In various embodiments, each of the seal walls 206, 208 may be orthogonal to the case 202. The seal walls 206, 208 define a seal groove 204 axially therebetween. The seal groove 204 comprises a forward face 212, an aft face 216, and a base 214. A seal member 210 is seated toward the base 214 in the seal groove 204 and retained axially relatively between the forward face 212 and the aft face 216. In various embodiments and in operation of the gas turbine engine 20, the seal member 210 may be loaded relatively toward the forward face 212 as indicated by arrow F. In response, the seal groove may 204 may experience wear, fretting, and/or the like within the groove 204 at the forward face 212 and the base 214. In various embodiments and in response to seal groove 204 experiencing wear in the forwarded loaded condition, the groove surface may be eroded to generate a forward worn face 212' and a worn base 214'. Such wear and/or erosion of the seal groove 204 tends to degrade performance of the piston seal assembly 200, for example, by allowing gasses to bypass the seal member 210 along the worn surfaces (forward face 212', base 214').

In various embodiments and with additional reference to FIG. 3A, a tool 300 is applied to the seal groove 204. In various embodiments, the tool 300 may be a machining tool applied directly to the worn surfaces (212', 214'). In various embodiments, the tool 300 may be an ablative tool such as, for example, a laser. Tool 300 operations continue until the entire worn surface of the seal groove 204 is removed (e.g., by machining, ablation, polishing, lapping, etc.) as shown in FIG. 3B. In various embodiments and with additional reference to FIG. 3B, the seal groove 204 has been enlarged by the tool 300 operation to generate a worked seal groove 204'. In like regard, the worked seal groove 204' may be further defined by a reduced wall 206' (as illustrated, a reduced forward wall) which is thinned by tool 300 operations. In various embodiments, the worked seal groove 204' may not provide adequate retention for the seal member 210.

Figure 4A:
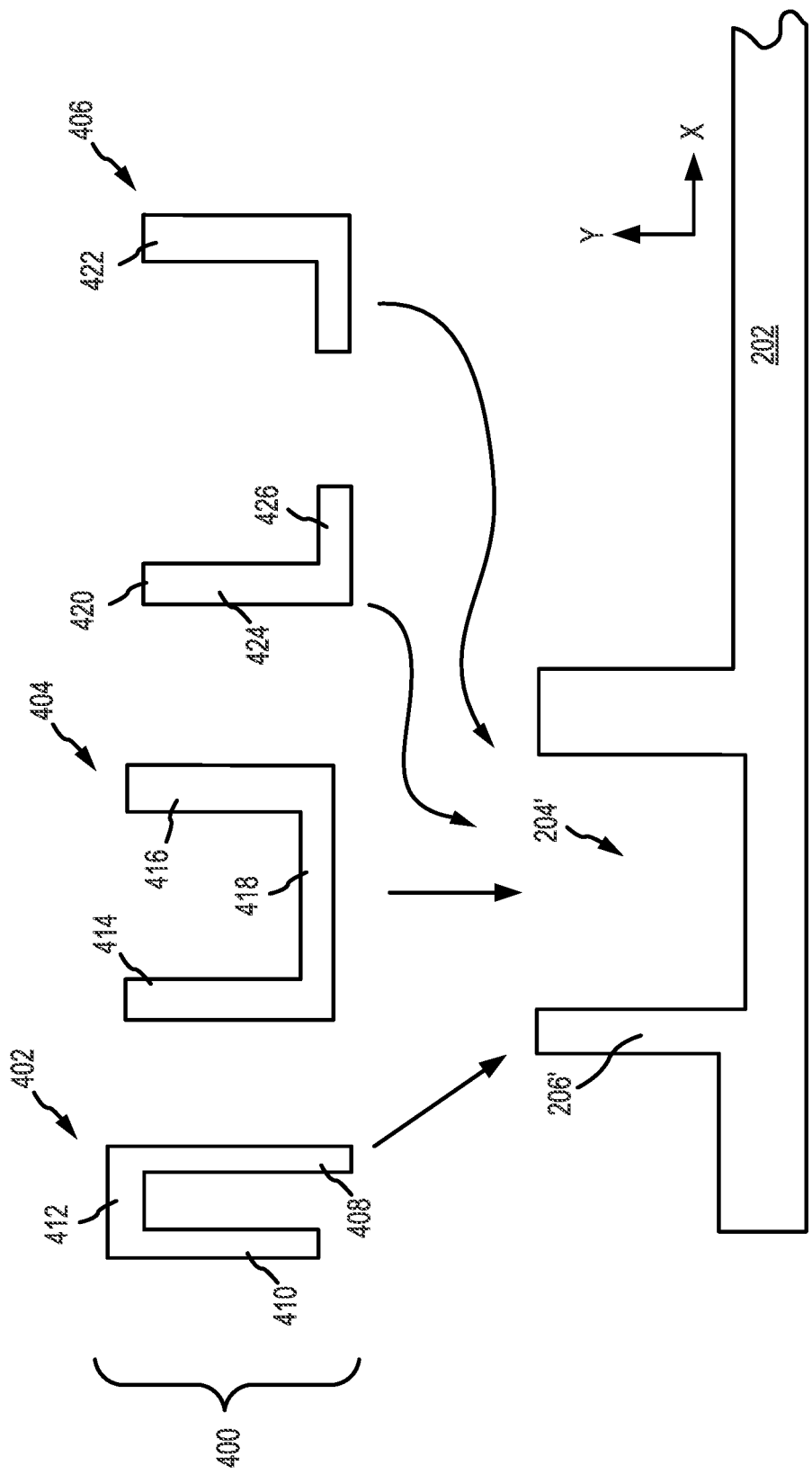
FIG. 4A illustrates groove buildup members of a piston seal assembly, in accordance with various embodiments.

In various embodiments and with additional reference to FIG. 4A, one or more groove buildup members 400 such as, for example, a first groove buildup member 402, a second groove buildup member 404, and/or a third groove buildup member 406 may be inserted (e.g., along arrows) into the worked seal groove 204' and/or over the reduced wall 206'. In various embodiments, the buildup member 400 may be manufactured from the same parent material, a different material, a ceramic material, or a coated material. In various embodiments, a groove buildup member 400 may be formed for an appropriate metal or other material which is similar to the parent material (such as, for example, steel, stainless steel, aluminum alloy, titanium alloy, nickel alloy, and/or the like) and which provides wear characteristics equivalent or superior to the material of the case 202. The groove buildup member 400 may be secured to the worked seal groove 204' by any suitable process such as, for example, brazing, press fitting, welding, bonding, crimping, staking, a retention feature (e.g., undercutting) and/or the like.

In various embodiments, the first groove buildup member 402 may be a guard type member configured to interface with the reduced wall 206'. The guard type member comprises an inner guard 408 and an outer guard 410 joined at a distal end by an orthogonal web 412. The inner guard 408 is configured to be disposed within the worked seal groove 204' and may be relatively radially (along the Y-axis) longer than the outer guard 410. Stated another way, the outer guard 410 may be shorter than the inner guard 408. As shown in FIG. 4B, the first groove buildup member 402 may be coupled to the reduced wall 206' and the seal member 210 may be disposed in the worked seal groove 204' to complete the rebuild of the piston seal assembly 200.

In various embodiments, the second groove buildup member 404 may be an insert type member comprising a forward wall 414, an aft wall 416, and a mutually orthogonal base web 418 joining the forward wall 414 and the aft wall 416. The insert type member is configured to be disposed within the worked seal groove 204'. As shown in FIG. 4C, the second groove buildup member 404 is inserted into the worked seal groove 204'. The forward wall 414 and the aft wall 416 are contacted, respectively, with the reduced wall 206' and the aft seal wall 208. In like regard, the base web 418 is contacted with the base of the worked seal groove 204. The seal member 210 is disposed within the second groove buildup member 404 to complete the rebuild of the piston seal assembly 200.

In various embodiments, the third groove buildup member 406 may comprise a sectioned insert type member including a forward section 420 and an aft section 422. Each section may be relatively L-shaped and defined by a leg member 424 and an orthogonal foot member 426 which extends at a distal end of the leg member 424. Each section (420, 422) is configured to be disposed within the worked seal groove 204' and may be configured to retain the seal member 210 relatively therebetween as shown in FIG. 4D. In various embodiments as shown in FIG. 4E, a rework procedure may call for only one section of a sectioned insert type member to be inserted into the worked seal groove 204'. For example, where the reduced wall 206' is generated from the forward seal wall 206, the forward section 420 of the third groove buildup member 406 may be inserted into the worked seal groove 204'. In various embodiments, the forward section 420 may comprise an elongate foot 426' configured to extend across the entirety of the base of the worked seal groove 204'. The seal member 210 is disposed within the respective section (as illustrated, the forward section 420) of third groove buildup member 406 to complete the rebuild of the piston seal assembly 200.

Figure 4F:
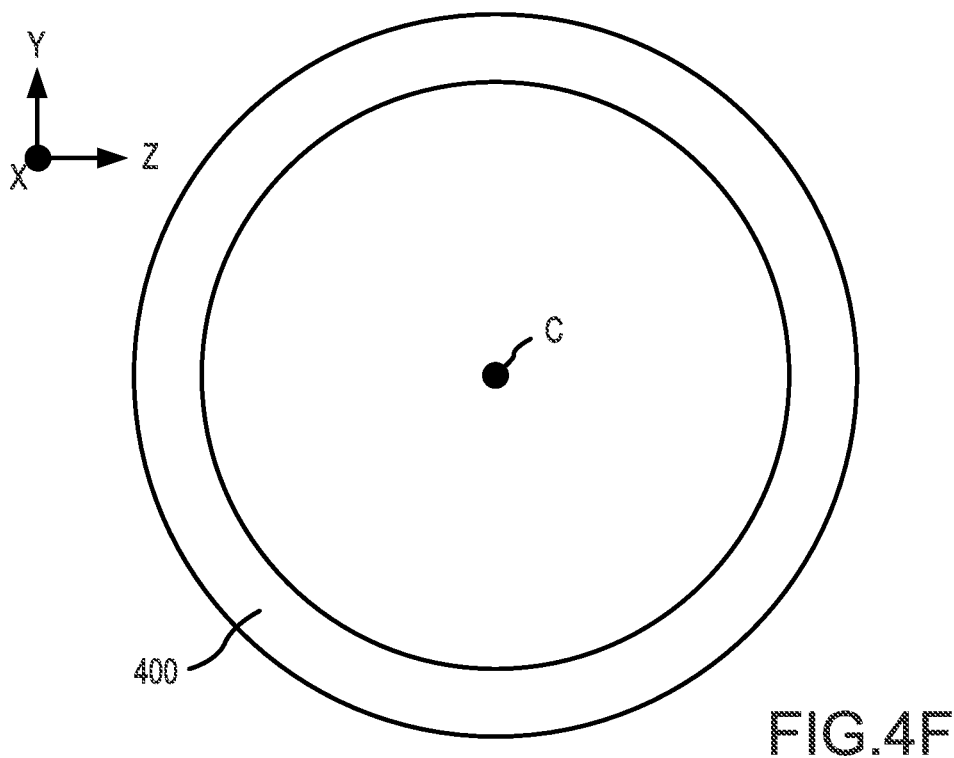
FIG. 4F a groove buildup member, in accordance with various embodiments.
Figure 4G:
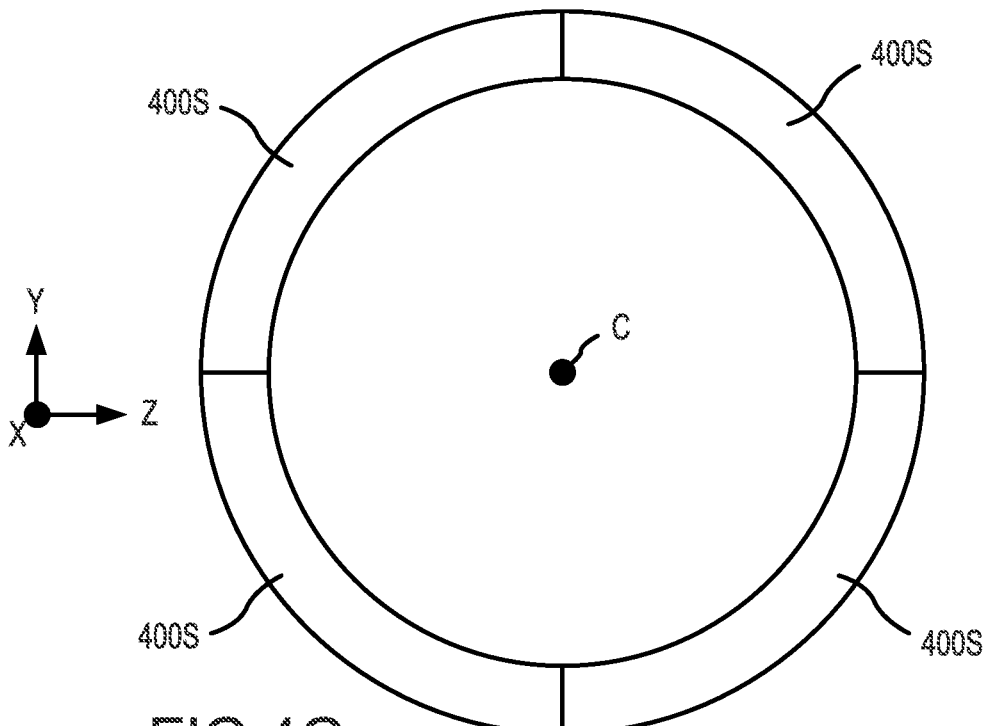
FIG. 4G a groove buildup member, in accordance with various embodiments.

In various embodiments and with additional reference to FIGS. 4F and 4G groove buildup member 400 is viewed along the Z-axis through the Y-Z plane. In various embodiments, a groove buildup member 400 may be continuous about a center axis C (e.g, axis A-A of engine 20) or may be formed of a plurality of circumferentially segmented sections 400S (i.e., arcuate segments) all centered about the center axis C.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of repairing a piston seal assembly, comprising:
   removing worn material from a piston seal groove to generate a worked seal groove, wherein the worked seal groove is generated between a forward seal wall and an aft seal wall of the piston seal groove, wherein the forward seal wall and the aft seal wall extend radially from a case comprising the piston seal assembly, wherein after removing the worn material, one of the seal walls comprises a first thickness and the other seal wall comprises a second thickness, wherein the first thickness is smaller relative the second thickness;
   applying a groove buildup member to the worked seal groove, wherein the groove buildup member is a guard type member, wherein the guard type member comprises an inner guard and an outer guard joined at a distal end by an orthogonal web, wherein the outer guard is shorter relative the inner guard, wherein the inner guard is disposed within the worked seal groove, wherein the guard type member is configured to interface with the seal wall having the first thickness, wherein the orthogonal web of the guard type member is disposed over the seal wall having the first thickness; and
   disposing a seal member proximate the groove buildup member.

2. The method of claim 1, further comprising securing the groove buildup member to the worked seal groove.

3. The method of claim 1, wherein the groove buildup member is circumferentially continuous.

* * * * *